July 23, 1940.  I. GOLDFINGER  2,209,118
CIRCUIT CONTROL DEVICE FOR MOTOR VEHICLES
Filed May 5, 1936  2 Sheets-Sheet 1

INVENTOR.
I. Goldfinger
BY
Glascock Downing Seebell
ATTORNEYS.

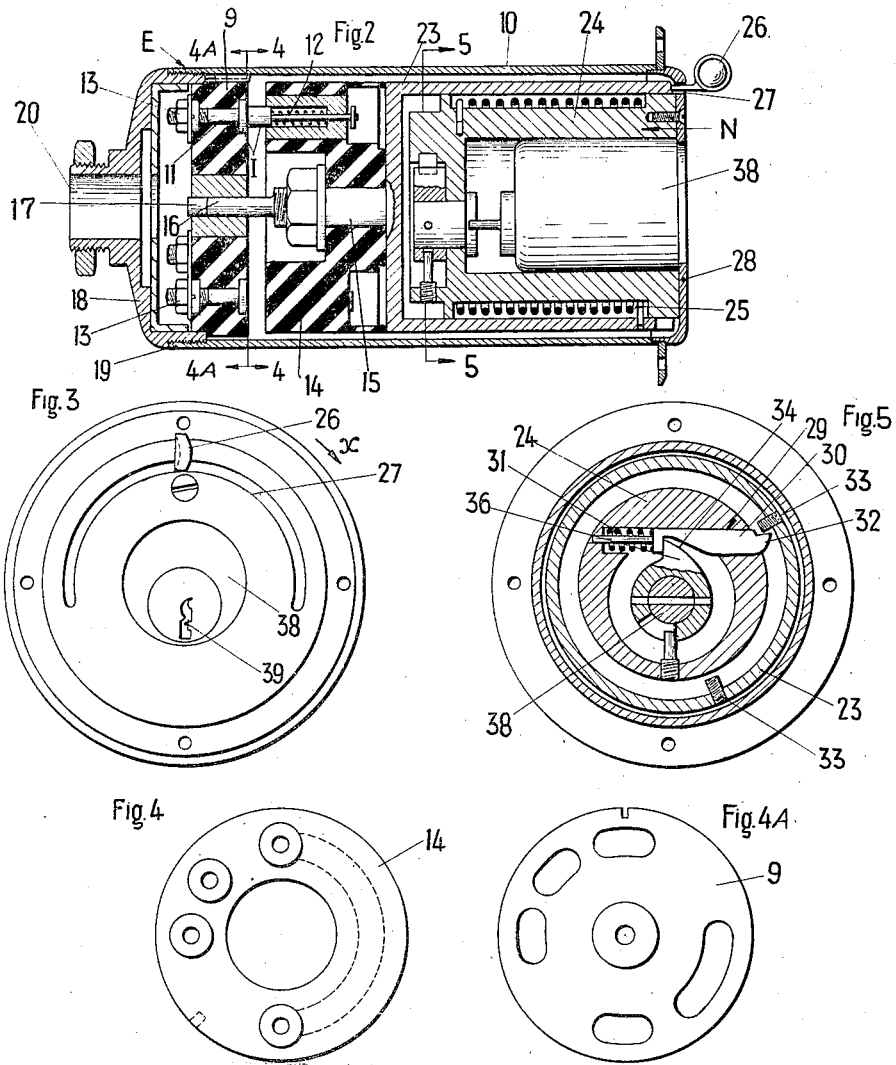

Patented July 23, 1940

2,209,118

UNITED STATES PATENT OFFICE 2,209,118

CIRCUIT CONTROL DEVICE FOR MOTOR VEHICLES

Isidoro Goldfinger, Milan, Italy

Application May 5, 1936, Serial No. 78,061
In Italy May 7, 1935

1 Claim. (Cl. 200—44)

This invention has for its object to provide a device for preventing the operation of motor vehicles by unauthorised persons, by disconnecting the ignition battery or the like from the ignition circuit.

The device according to the invention is essentially characterised by the fact that in the ignition circuit a circuit control device is inserted, the working of which is controlled by a key lock, preferably in such a manner that the circuit control device can be moved to inoperative position without use of the key, but cannot be restored to operative position unless the control device is previously opened by means of the key.

The invention will now be described on reference to the accompanying drawings which illustrate, merely for indicating and not for limiting purposes, a preferred embodiment of the invention.

Fig. 2 is a longitudinal section of the circuit control device operable by a key.

Fig. 3 is an end view thereof.

Fig. 4 is a partial view along 4—4 in Fig. 2 of the rotatable part of the circuit control device.

Fig. 4A is a partial cross view along 4A—4A of Fig. 2 showing the stationary part of the device.

Fig. 5 is a cross section along 5—5 of Fig. 2.

Figure 1:
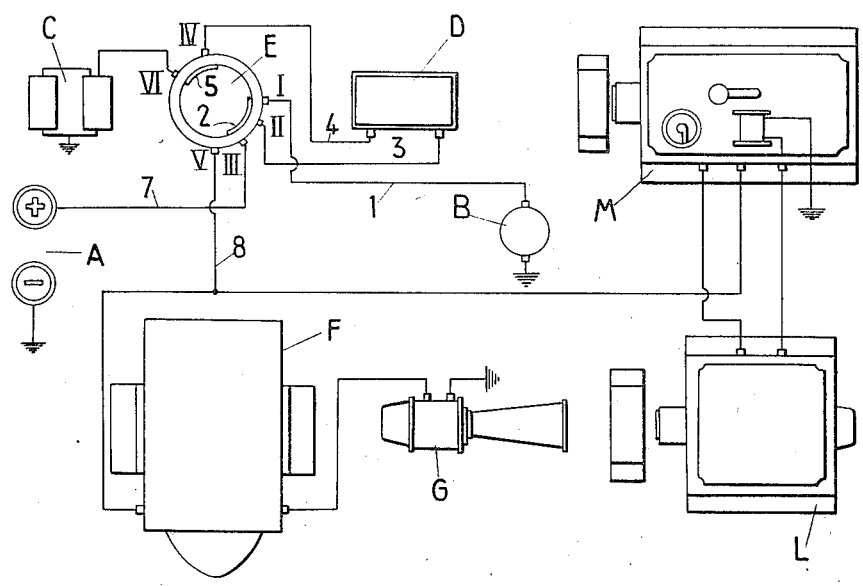
Fig. 1 is a diagrammatic view of a circuit showing the application of the invention to a motorcar.

Referring to Fig. 1, A are the terminals of the battery, B the generator, C the ignition coil, D the switchboard such as are commonly used in automobiles. The control device which is characteristic of the invention is indicated with E, while F indicates a device capable of causing the operation of an acoustic alarm device G; L is an electromagnetic lock of the type, for instance, disclosed in another patent by the same inventor, and M is the apparatus for opening the lock L or the lock arranged on the vehicle.

In normal position, the current of the generator B flows to the circuit control device E through wire 1 leading to the contact I, and then goes to the bridge 2 of the control device E from whence it passes to the contact II and then, through the wire 3, to the switchboard D. From the switchboard the wire 4 leads to the contact IV. Across a further bridge member 5 of the circuit control device E, the current reaches the contact VI which by a wire 6 is connected to the primary winding of the ignition coil C. The contact III which, through the bridge 2, is connected to the contact I (which is connected to the generator), and which through the wire 7 is connected to the positive pole of the battery, serves to charge the battery while the automobile is running. Under these conditions the vehicle operates normally and the electric distribution accordingly works in the ordinary manner.

If in the manner that will be specified later on an angular movement of 90° is imparted to the circuit control device E, the bridges 2 and 5 alter their position so as to completely break the specified circuit. With a further rotation through 90°, the two bridges again alter their position in such a manner that the bridge 2 remains inoperative while the bridge 5 covers the contact II, III and V. The contact III is connected through the wire 7 to the battery A; the contact V is connected through the wire 8 to the elements F—G—M. The bridge 2 therefore connects the battery A to the switchboard D and to the other parts.

It will be noticed that, although current is supplied to the switchboard D, the ignition coil C cannot operate because the line 6—4 is interrupted.

A circuit control device constructed in accordance with the invention and adapted for use in a circuit such as above described as shown in detail in Figs. 2 to 5. The circuit control device E comprises an insulating body 9 fixed in a casing 10 and having a set of axial bores 11 in which are lodged the stationary contacts, which are provided with terminals 13 for connecting the wires. Against said stationary contacts are pushed the movable contacts (Fig. 2), consisting in slidable stems urged by springs 12, said contacts being carried by a rotatable plate 14. This plate 14 is secured to a pivot 15 having an extension 16 rotatably mounted in the central bore 17 of the insulating body 9. The system of the terminals is enclosed by a cover 18 threaded at 19 and provided with an aperture 20 for the passage of electric wires.

The spindle 15 is connected with the revolving portion 23 of the control N. This control comprises a stationary portion 24, on which is rotatably mounted the said portion 23 which is subjected to the rotary influence of a return spring 25. The portion 23, having the shape of a cylinder, is fitted with a handle 26 projecting to the outside through a semi-circular slot 27 formed in the front plate 28 of the stationary body 24. In a bore 29 of the stationary body 24 a sliding bolt 30 is lodged, the bolt being pressed by a spring 31 and serving as a stop in the two angular positions of the commutator E. To this effect the portion 23, in the corresponding angular positions, is fitted with projecting pins 33 which coact with the bevelled operating end 32 of the sliding bolt 30. By means of the handle 26 the movable portion can be revolved in the direction of the arrow —x—, Fig. 3, so as to make it perform the two successive angular movements through 90° as explained above; at the end of each angular movement, the automatic return of the movable portion under the action of the return spring 25 is prevented by the engagement of the back of the bolt 30 with the corresponding projecting pin 33. On the contrary, in order to allow of the said return, it is necessary that the sliding bolt 30 be drawn back against the action of the spring 31. For this purpose the sliding bolt 30 is provided with a notch 34 in which projects the nose of a cam 36 forming part of revolving lock 38. After inserting the key into the key-hole 39, the key is turned in the proper direction to open the lock; accordingly the nose of the cam 36 causes the displacement of the sliding bolt 30 which is forced again into the bore 29 and disengaged from the projecting pin 33. The rotatable parts 14 and 23 are now free to take up again their initial position under the influence of the spring 25.

Having now described my invention and how the same is to be carried out, what I claim as my invention is:

A circuit control device for motor vehicles comprising a fixed member, a contact control member rotatably mounted externally of said fixed member, an internal projection on said rotatable member, a locking member movable in the fixed member and cooperating with said projection to lock the rotatable member against rotation in one direction, key controlled means arranged internally of the fixed member adapted to displace the locking member to inoperative position and release the rotatable member for rotation in said direction, and means disposed between said rotatable and fixed members normally tending to rotate the rotatable member in said direction.

ISIDORO GOLDFINGER.